United States Patent [19]

Amaike et al.

[11] Patent Number: 5,658,513
[45] Date of Patent: Aug. 19, 1997

[54] CROSS-HEAD DIE AND METHOD FOR MANUFACTURING A RESIN STRUCTURE REINFORCED WITH LONG FIBERS

[75] Inventors: Takeshi Amaike; Yoshimitsu Shirai, both of Shizuoka, Japan

[73] Assignee: Polyplastics Co., Ltd., Japan

[21] Appl. No.: 543,714

[22] Filed: Oct. 16, 1995

[30] Foreign Application Priority Data

Oct. 18, 1994 [JP] Japan ................... 6-277176

[51] Int. Cl.$^6$ ............................................. B29C 47/02
[52] U.S. Cl. ............... 264/171.13; 156/180; 264/136; 264/171.23; 264/177.2; 425/112; 425/114
[58] Field of Search ................ 264/171.23, 171.13, 264/177.2, 136; 425/112, 114; 156/180

[56] References Cited

U.S. PATENT DOCUMENTS

| | | | |
|---|---|---|---|
| 3,993,726 | 11/1976 | Moyer | 264/209.4 |
| 4,439,387 | 3/1984 | Hawley | 264/136 |
| 4,588,538 | 5/1986 | Chung et al. | 264/136 |
| 4,883,625 | 11/1989 | Glemet et al. | 264/136 |
| 4,937,028 | 6/1990 | Glement et al. | 264/136 |
| 5,268,050 | 12/1993 | Azari | 156/180 |
| 5,277,566 | 1/1994 | Augustin et al. | 425/114 |
| 5,409,763 | 4/1995 | Serizawa et al. | 428/220 |
| 5,500,175 | 3/1996 | Bradt | 264/171.23 |

FOREIGN PATENT DOCUMENTS

| | | |
|---|---|---|
| 0 364 828 A2 | 10/1989 | European Pat. Off. |
| 0 712 716 A1 | 11/1995 | European Pat. Off. |
| 63-264326 | 11/1988 | Japan |
| 3-272830 | 4/1991 | Japan |
| 3-272830 | 12/1991 | Japan |

OTHER PUBLICATIONS

Abstract/Zusammenfassung/Abrege 95307351.7 Dec. 1995.

*Primary Examiner*—Jeffery R. Thurlow
*Attorney, Agent, or Firm*—Nixon & Vanderhye P.C.

[57] ABSTRACT

A cross-head die for the manufacture of long fiber-reinforced resin structures enhances fiber loosening and resin melt impregnation of fiber bundle near its inlet. A passageway along which the fiber bundle travels is defined between the die inlet and outlet and is in communication with a resin port to allow a resin melt to be introduced thereinto so as to impregnate the traveling fiber bundle. The passageway meanders relative to the common plane so as to establish a plurality of alternating successive peak and valley portions each having a substantially constant pitch dimension as measured at adjacent crossing points of the passageway with the common plane. A first peak or valley portion adjacent to the inlet has a greater height dimension as measured from the common plane as compared to a last peak or valley portion adjacent the outlet. Intermediate peak and valley portions between the first and last peak or valley portion have the same or lesser height as compared to an adjacent upstream one of the intermediate peak or valley portions. In such a manner, the tension on the fiber bundle will be greater near the inlet as compared to the outlet so as to enhance fiber bundle loosening and resin melt impregnation thereat.

15 Claims, 2 Drawing Sheets

CROSS-HEAD DIE AND METHOD FOR MANUFACTURING A RESIN STRUCTURE REINFORCED WITH LONG FIBERS

BACKGROUND OF THE INVENTION

1. Field of the Invention

The present invention relates to a cross-head die and a method for manufacturing a resin structure reinforced with long fibers using the cross-head die. More particularly, the invention relates to a cross-head die which is used for impregnating a continuous fiber bundle with a thermoplastic resin melt by passing the fiber bundle through a vertically meandering passage in the die (impregnation die), in which a plurality of top portions and a plurality of bottom portions of the meandering passage are designed to have a variety of heights. It also relates to a method for manufacturing a resin structure reinforced with long fibers using the cross-head die.

2. Background of the Invention

Resin structures reinforced with long fibers made of parallel aligned fiber bundles and a thermoplastic resin permeating the fiber bundles are primarily processed into elongated pellets, which are used for manufacturing various molded products which require mechanical strength. The resin structures are prepared by passing a fiber bundle which is typically of continuous glass fibers through a passage in a cross-head die, impregnating the fiber bundle with a thermoplastic resin in the die, and shaping the impregnated fiber bundle to a desired shape such as that of a pellet using a shaping die. Such a technique is disclosed, for example, in U.S. Pat. No. 4,39,387, Japanese Patent Application Laid-open (kokai) No. 3-272830, and Japanese Patent Application Laid-open (kokai) No. 63-264326.

In the process of manufacturing resin structures reinforced with long fibers disclosed in the above references, a plurality of vertically meandering passages provided in the cross-head die have a regular pitch and height. Therefore, a tensile force applied to the continuous fiber bundle at the top or bottom portions of the passage when the fiber bundle contacts such portions is always identical. In this case, impregnation performance is improved as the number of top and bottom portions passed by the fiber bundle increases.

Thus, although a conventional cross-head die provides improved impregnation performance in proportion to the number of top and bottom portions, it has a disadvantage that excessive tension is applied to the fiber bundle, and this drawback is considerable particularly at the top or bottom portions close to the outlet of the cross-head die. Excessive tension causes fuzzy fibers in a fiber bundle, and in addition, sometimes causes strand breakage (broken fiber bundle) when the fiber bundle passes through the die, or causes entangled fibers on products such as pellets. Needless to say, when such defective products are molded, the resulting molded products will have poor quality.

The present inventors carried out extensive studies in an attempt to solve the above problems involved in the manufacture of resin structures reinforced with long fibers in which a continuous fiber bundle is impregnated with a thermoplastic resin melt while passing the fiber bundle through a cross-head die. As a result, they found that it is very effective to vary the height of the vertically meandering top or bottom portions of the passage in a cross-head die for avoiding inconvenient breakage of fiber bundles and for enhancing the impregnation performance. The present invention was accomplished based on this finding.

SUMMARY OF THE INVENTION

An object of the invention is therefore to provide an improved cross-head die which is used for the manufacture of a resin structure reinforced with long fibers.

Another object of the present invention is to provide a method for manufacturing a resin structure reinforced with long fibers using the improved cross-head die.

In one aspect of the present invention, there is provided a cross-head die which is used for the manufacture of a resin structure reinforced with long fibers, in which manufacture a continuous fiber bundle is continuously pulled through a passage provided in the die, while a thermoplastic resin melt is discharged into the passage to impregnate the traveling fiber bundle with the thermoplastic resin melt; wherein the passage has an inlet and an outlet in the same plane and meanders with a predetermined pitch in such a manner that the passage crosses the plane a plurality of times alternately from the lower side of the plane to the upper side and vice versa so as to form a plurality of top portions and a plurality of bottom portions. The height of the top or the bottom of the top or the bottom portion which the continuous fiber bundle first contacts is greater than the height of the top or the bottom of the top or the bottom portion which the continuous fiber bundle last contacts. The height of the top or the bottom of an intermediate top portion or a bottom portion is the same as the height of the top or the bottom of either one of its neighboring top or bottom portions, or diminishes in a downstream direction from the inlet to the outlet, with all heights being measured from the plane.

In another aspect of the present invention, there is provided a method of manufacturing a resin structure reinforced with long fibers in which a continuous fiber bundle is continuously pulled through a passage provided in a cross-head die, the passage having an inlet and an outlet in the same plane and meandering with a predetermined pitch in such a manner that the passage crosses the plane a plurality of times alternately from the lower side of the plane to the upper side and vice versa so as to form a plurality of top portions and a plurality of bottom portions, while a thermoplastic resin melt is discharged into the passage to impregnate the traveling fiber bundle with the thermoplastic resin melt. The cross-head die has a structure such that the height of the top or the bottom of the top or the bottom portion which the continuous fiber bundle first contacts is greater than the height of the top or the bottom of the top or the bottom portion which the continuous fiber bundle last contacts. The height of the top or the bottom of an intermediate top portion or a bottom portion is the same as the height of the top or the bottom of either one of its neighboring top or bottom portions, or diminishes in a downstream direction from the inlet to the outlet, with all heights being measured from the plane.

The above and other objects, features, and advantages of the present invention will become apparent from the following description considered in connection with the accompanying drawings.

DESCRIPTION OF PREFERRED EMBODIMENTS

In the cross-head die of the present invention, the height of the top or the bottom o a vertically meandering passage provide inside the die varies. With this structure, the tension applied to the fiber bundle is the greatest at the top or the bottom portion which the continuous fiber bundle first contacts. The greatest amount of fiber loosening and impregnation can be obtained at this portion. Thereafter, since the fiber bundle contacts lower top portion(s) and/or higher bottom portion(s), the fiber bundle undergoes relatively light impregnation compared with the impregnation in the first top or bottom portion that the fiber bundle contacted. Accordingly, fuzzy fibers and breakage of fiber bundles can be effectively prevented without impeding impregnation as a whole.

The present invention will be described in more detail while referring to the accompanying drawings. However, the invention is not limited only to the cross-head die and the method for manufacturing resin structures reinforced with long fibers which are described herein.

Figure 2:
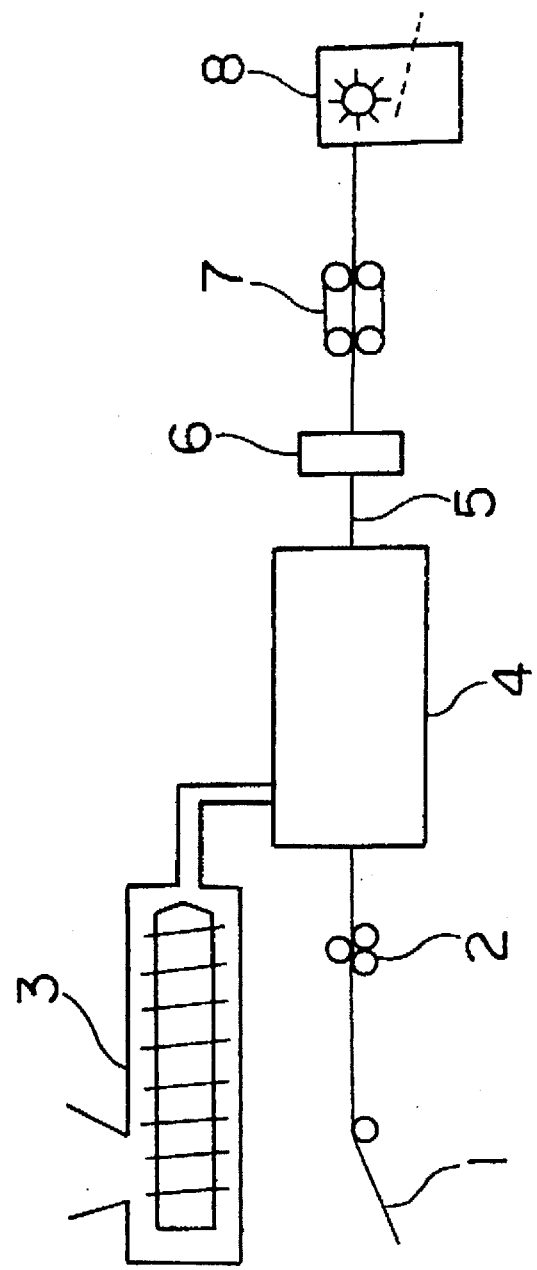
FIG. 2 is a schematic illustration showing an example of the method of the present invention for manufacturing a resin structure reinforced with long fibers.

FIG. 2 shows an example of the steps of the present invention for manufacturing a resin structure reinforced with long fibers. In FIG. 2, 1 is a fiber bundle taken out of a roving. 2 is a roll bar, 3 is an extruder which supplies a thermoplastic resin melt, 4 is a cross-head die for impregnating the fiber bundle 1 with a thermoplastic resin melt, 5 is a continuous fiber bundle which has been impregnated with a thermoplastic resin melt, 6 is a shaping die, 7 is a take-up roll, and 8 is a pelletizer.

The continuous fiber bundle 1 is preferably twist-free, and undergoes a fiber-loosening step between roll bars 2. Although roll bars are employed in FIG. 2, other fiber-opening means may also be used, such as static electricity, blown air (air jet), a water jet, a tension bar, and a needle punch.

The continuous fiber bundle 1 which has undergone a fiber-loosening step is impregnated with a thermoplastic resin melt supplied from the extruder 3 in the cross-head die 4. The resulting resin-impregnated continuous fiber bundle 5 is shaped to have a desired shape with a shaping die 6 such as a strand, rod, ribbon, tape, sheet, plate, or any other special shape, and at the same time, the fiber bundle is uniformly impregnated with the thermoplastic resin or the impregnation is accelerated. The continuous fiber bundle impregnated with a resin melt 5 is took up with take-up rolls 7 after passing through the shaping die 6. In FIG. 2, the take-up rolls 7 employ upper and lower endless belts. The resin structure reinforced with long fibers which has been taken up is cut to an arbitrary length with a pelletizer 8. The cut resin structure is then shaped or submitted to other processes. The thus-obtained resin structure reinforced with long fibers contains reinforcing fibers which have substantially the same length as the resin structure and which are aligned in parallel to the longitudinal direction of the resin structure.

The fiber species of the fiber bundle is not particularly limited in the present invention. For example, any high melting point fibers such as glass fibers, carbon fibers, metal fibers, or aromatic polyamide fibers may be used. Although these fibers are generally treated with a surface treatment agent (binder), such treatment is not necessarily required. Among the fibers, glass fibers are preferable in view of the strength and price of the resulting resin structure reinforced with long fibers. In addition, a preferable Tex number of the continuous fiber bundle used in the present invention is normally from 4,400 to 120, and more preferably from 2,200 to 740.

In the present invention, the thermoplastic resin used for impregnating the fiber bundle is either crystalline or amorphous. Examples of the thermoplastic resin include polyolefins such as polyethylene and polypropylene; polyesters such as polyethylene terephthalate and polybutylene terephthalate; polyamides such as nylon 6, nylon 66, nylon 11, nylon 12, nylon 610 and nylon 612; polyacetals; polycarbonates, thermoplastic polyurethanes, polyphenylene sulfides, polyphenylene oxides, polysulfones, polyetherketones, polyetheramides, polyetherimides, acrylonitrile/styrene resins, and combinations of these thermoplastic resins. The molecular weight of these resins is not particularly limited as long as they exhibit proper fiber-reinforcing effects when impregnated in the fibers. Various additives may be added to the thermoplastic resins in accordance with the end use of the resin structure reinforced with long fibers and conditions under which the resin structure is used. Such additives include antioxidants, antistatics, impregnation accelerators, plasticizers, mold releasing agents, fire retardants, fireproofing aids, crystallizing accelerators, and colorants.

Figure 1:
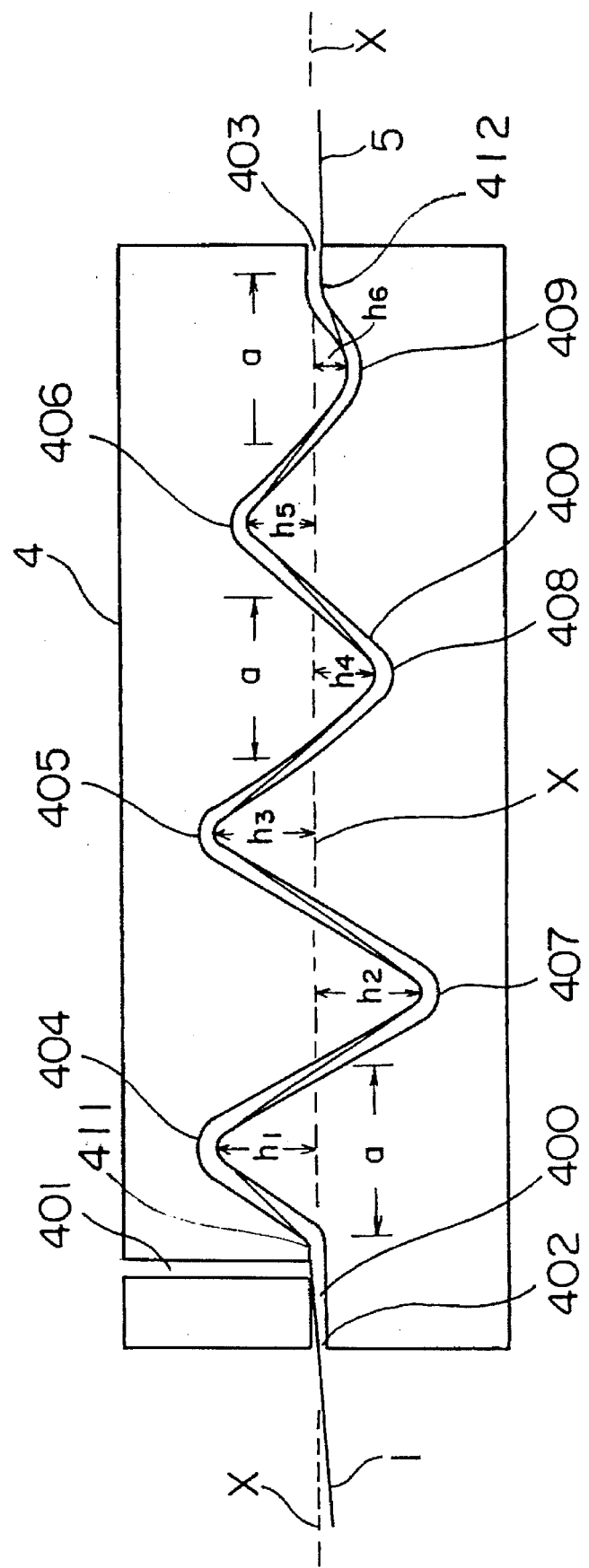
FIG. 1 is a schematic illustration of an example of the cross-head die of the present invention.

The cross-section of the cross-head die 4 of the present invention is shown in FIG. 1. In FIG. 1, 401 is a pathway for introducing a thermoplastic resin melt. Indicated by 402 and 403 are an inlet and outlet of a passage 400, respectively. Usually, the passage 400 has a uniform shape over the entire length from 402 to 403, and runs up and down in a meandering manner as shown in FIG. 1. 404, 405, and 406 are the top portions of the passage 400, and 407, 408, and 409 are the bottom portions. Tension is applied to a continuous fiber bundle 1 when the fiber bundle contacts these top and bottom portions. At this time, the fibers of the fiber bundle are loosened and impregnated with a thermoplastic resin melt supplied from the pathway 401. In FIG. 1, only one continuous fiber bundle 1 is shown which passes through the cross-head die 4. However, it is a usual practice in the art that many continuous fiber bundles are aligned in parallel to each other in the direction perpendicular to the sheet of FIG. 1, effecting a simultaneous impregnation to them. In the present invention, the words "top portion(s)" and "bottom portion(s)" have the meaning described above. Accordingly, although some tensile force is in fact applied to the continuous fiber bundle 1 at portions 411 and 412, where the fiber bundle first and last contacts, they are not referred to as a "top portion" or a "bottom portion" in the present invention.

The cross-head die 4 according to the present invention has some characteristic features. That is, the inlet 402 and outlet 403 of the passage 400 are on the same plane X as shown by a broken line in FIG. 1. The pitch of the meandering passage (indicated by "a" in FIG. 1) which runs up and down across the plane is constant. Assuming that the height of the top or bottom portion which first contacts the continuous fiber bundle (note that it is the top portion 404 in FIG. 1, not the bottom portion 407) measured from the plane X is $h_1$ and the height of the top or bottom portion which last contacts the continuous fiber bundle (note that it is the bottom portion 409) measured from the plane X is $h_6$, $h_1$ is greater than $h_6$. Moreover, the height of any one of the intermediate top or bottom portions which are adjacent to each other, i.e., $h_2$, $h_3$, $h_4$, or $h_5$, is the same as the height of the top or the bottom of either one of its neighboring top or bottom portions, or diminishes in a downstream direction from the inlet to the outlet. In FIG. 1, $h_2$ is the same as the heights of its neighboring top and bottom portions ($h_1$, $h_3$); $h_4$ is equal to $h_5$ and smaller than $h_3$; and $h_6$ is smaller than $h_5$. Accordingly, tension applied to the continuous fiber bundle 1, which varies depending on the height of the top and bottom portions, is the greatest at the first top portion 404 and the smallest at the last bottom portion 409. Intermediate top and bottom portions create identical or diminishing tensile force applied to the fiber bundle.

When the cross-head die of the present invention is applied to a method for manufacturing a resin structure reinforced with long fibers as in FIG. 2, the cross-head die is usually set so that the plane X of the die is horizontal. Thus, according to the method for manufacturing a resin structure reinforced with long fibers of the present invention, the aforementioned plane is a horizontal plane.

In FIG. 1, three different heights, i.e., high, medium, and low heights, are employed for the top or bottom portions of the passage provided in the cross-head die of the present invention. However, only two heights, i.e., high and low, may be employed. Alternatively, four or more different heights may be possible. However, an aimless increase in variation will lead to a complicated manufacture of the cross-head die and reduced effects, it is recommended that two different heights (high and low) or three different heights (high, medium and low) be employed. In addition, although the number of the top or bottom portions having the same height is not particularly limited, it is normally 1 to 8, and the sum of the number of top and bottom portions is generally 2 to 12, and preferably 3 to 10.

EXAMPLES

Examples 1–2 and Comparative Examples 1–3:

Using the apparatus shown in FIG. 2, a polypropylene-impregnated glass fiber bundle composed of 50% by weight of polypropylene and 50% by weight of glass fibers was taken up at a speed of 4 m/min. After cutting, resin structures reinforced with long fibers with a pellet shape having a length of 12 mm were manufactured (Example 1).

In Example 2 and Comparative Examples 1–3, the procedure similar to that employed in Example 1 was repeated except that the top and bottom portions of the passage of the cross-head die are arranged as shown in Table 1. In Table 1, the word "top-to-bottom distance" is intended to mean the pitch of the meandering passage corresponding to "a" in FIG. 1.

The frequency of strand breakage occurred during the operation, amount of separated glass, and the tensile strength measured on test pieces manufactured by a conventional injection molding process using he pellets are shown in Table 1.

As described hereinabove, when the cross-head die of the present invention is used in accordance with the method for manufacturing a resin structure reinforced with long fibers, fiber loosening of the continuous; fiber bundle which passes through the cross-head die and impregnation of the resin melt in the fiber bundle can be effectively performed. And as a result, breakage of the fiber bundle is prevented, and an excellent resin structure reinforced with long fibers with no fuzzy fibers can be obtained.

What is claimed is:

1. A cross-head die for manufacturing a resin structure reinforced with long fibers comprising:

a passage defined within the die through which a continuous fiber bundle may be continuously pulled;

a port in fluid-communication with the passage, to allow a thermoplastic resin melt to be discharged into the passage and impregnate the fiber bundle as the fiber bundle travels along said passage; wherein the passage has an inlet and an outlet disposed in a common plane with one another, and meanders alternately upwardly and downwardly relative to said common plane between said inlet and outlet in such a manner that the passage crosses the plane a plurality of times so as to form an alternating successive plurality of top portions and bottom portions, and in such a manner that each of said top and bottom portions has a substantially constant pitch dimension as measured at adjacent crossing points of said passage with the common plane; wherein a first one of the top or bottom portions which is first contacted by the continuous fiber bundle has a height as measured from said common plane which is greater than the height of a last one of the top or bottom portions which is contacted last by the continuous fiber bundle and wherein an intermediate one of said top or bottom portions has the same or lesser height as compared to the height of an immediately adjacent upstream bottom portion or top portion, respectively.

2. The cross-head die according to claim 1, wherein the plurality of top and bottom portions establish at least two heights between said inlet and said outlet.

3. The cross-head die according to claim 1, wherein the plurality of top and bottom portions establish at least three heights between said inlet and said outlet.

TABLE 1

|  | Ex. 1 | Comp. Ex. 1 | Comp. Ex. 2 | Ex. 2 | Comp. Ex. 3 |
|---|---|---|---|---|---|
| Top-to-bottom distance (mm) | 60 mm | 60 mm | 60 mm | 40 mm | 40 mm |
| Height of top or bottom × Number of top or bottom | 40 mm × 2<br>28 mm × 4 | 40 mm × 6 | 28 mm × 6 | 40 mm × 2<br>34 mm × 2<br>28 mm × 4 | 34 mm × 8 |
| Total number of top and bottom | 6 | 6 | 6 | 8 | 8 |
| Frequency of strand breakage (per 24 hours) | 0 | 3 | 0 | 0 | (could not operated) |
| Amount of separated glass (ppm) | 19 | 17 | 125 | 9 | — |
| Tensile strength (kg/cm$^2$) | 1508 | 1491 | 1250 | 1490 | — |

4. A method of manufacturing a resin structure reinforced with long fibers comprising:
   (a) continuously pulling a continuous fiber bundle through a passage provided in a cross-head die, the passage having an inlet and an outlet in a common plane and meandering alternately upwardly and downwardly relative to the common plane between the outlet and inlet in such a manner that the passage crosses the plane a plurality of times so as to form a plurality of top portions and bottom portions, and in such a manner that each of the top and bottom portions has a substantially constant pitch dimension as measured at adjacent crossing points of said passage with the common plane;
   (b) discharging a thermoplastic resin melt into the passage to impregnate the fiber bundle with the thermoplastic resin melt as the fiber bundle travels along the passage so as to form a resin-impregnated fiber bundle; wherein
   (c) during practice of step (a), the fiber bundle is caused to travel through the passage of the cross-head die such that the fiber bundle first contacts a first one of the top or the bottom portions of the passage adjacent the inlet having a predetermined height as measured from the common plane which is greater than the height of a last one of the top or bottom portions which the continuous fiber bundle last contacts; and wherein
   (d) between said first and last ones of the top or bottom portions, the fiber bundle is caused to contact an intermediate one of the top or bottom portions which has the same or lesser height as compared to the height of an adjacent upstream top or bottom portions.

5. The method according to claim 4, wherein the plurality of top and bottom portions establish at least two heights between said inlet and said outlet.

6. The method according to claim 4, wherein the plurality of top and bottom portions establish at least three heights between said inlet and said outlet.

7. A cross-head die for the manufacture of long fiber-reinforced resin structures comprising:
   an inlet and an outlet positioned in a common plane relative to one another to allow a continuous bundle of fibers to enter into, and exit from, the die;
   a passageway along which the fiber bundle travels defined between said inlet and outlet;
   a resin port in communication with said passageway to allow a resin melt to be introduced thereinto so as to impregnate the traveling fiber bundle therein; wherein
   said passageway meandering relative to said common plane so as to establish a plurality of alternating successive peak and valley portions each having a substantially constant pitch dimension as measured at adjacent crossing points of said passageway with said common plane; and wherein
   a first peak or valley portion adjacent to said inlet has a greater height dimension as measured from said common plane as compared to a last peak or valley portion adjacent said outlet; and wherein intermediate peak and valley portions between said first and last peak or valley portion have the same or lesser height as compared to an adjacent upstream one of said intermediate peak or valley portions.

8. The cross-head die of claim 7, having at least one intermediate peak portion and at least one intermediate valley portion, said at least one intermediate peak and valley portions each having the same height as compared to said first peak or valley portion.

9. The cross-head die of claim 7, having at least one intermediate peak portion and at least one intermediate valley portion, said at least one intermediate peak and valley portions each having a lesser height as compared to said first peak or valley portion.

10. The cross-head die of claim 7, having at least two pairs of successive intermediate peak and valley portions, wherein an upstream pair of said successive intermediate peak and valley portions has a height which is the same as said first peak or valley portion, and wherein a downstream pair of said successive intermediate peak and valley portions has a height which is less than the height of said upstream pair of said successive intermediate peaks and valley portions.

11. The cross-head die of claim 7, wherein between 1 to 8 of said peak and valley portions have the same height.

12. The cross-head die of claim 11, having between 2 to 12 total peak and valley portions.

13. A method of manufacturing long fiber-reinforced resin structures comprising the steps of:
   (a) introducing a continuous bundle of fibers into an inlet of a cross-head die;
   (b) impregnating the continuous bundle of fibers with a resin melt near said inlet to form a resin-impregnated fiber bundle;
   (c) causing the resin-impregnated fiber bundle to travel along a passageway between said inlet and an outlet of said cross-head die which is located in a common plane with said inlet to cause the fiber bundle to meander along the passageway between a plurality of alternating successive peak and valley portions thereof each having a substantially constant pitch dimension as measured at adjacent crossing points of said passageway with said common plane such that a first peak or valley portion adjacent to said inlet has a greater height dimension as measured from said common plane as compared to a last peak or valley portion adjacent said outlet, and such that intermediate peak and valley portions between said first and last peak or valley portions have the same or lesser height as compared to an adjacent upstream one of said intermediate peak or valley portions; and
   (d) withdrawing said resin-impregnated fiber bundle from said outlet of said cross-head die.

14. The method of claim 13, wherein between 1 to 8 of said peak and valley portions have the same height.

15. The method of claim 14, having between 2 to 12 total peak and valley portions.

* * * * *